United States Patent
Beernaert

(10) Patent No.: US 10,319,240 B2
(45) Date of Patent: Jun. 11, 2019

(54) OPEN ARCHITECTURE FOR FLIGHT MANAGEMENT SYSTEM

(71) Applicant: THALES, Courbevoie (FR)

(72) Inventor: Julien Beernaert, Toulouse (FR)

(73) Assignee: THALES, Courbevoie (FR)

( * ) Notice: Subject to any disclaimer, the term of this patent is extended or adjusted under 35 U.S.C. 154(b) by 68 days.

(21) Appl. No.: 15/389,216

(22) Filed: Dec. 22, 2016

(65) Prior Publication Data
US 2017/0186328 A1  Jun. 29, 2017

(30) Foreign Application Priority Data

Dec. 23, 2015 (FR) .................................... 15 02677

(51) Int. Cl.
| | |
|---|---|
| *B64D 45/00* | (2006.01) |
| *G08G 5/00* | (2006.01) |
| *B64F 5/60* | (2017.01) |
| *G06F 21/62* | (2013.01) |

(52) U.S. Cl.
CPC ............ *G08G 5/003* (2013.01); *B64D 45/00* (2013.01); *B64F 5/60* (2017.01); *G06F 21/6218* (2013.01); *G08G 5/0004* (2013.01); *G08G 5/0047* (2013.01); *G08G 5/0073* (2013.01); *B64D 2045/0075* (2013.01)

(58) Field of Classification Search
CPC .................................. G08G 5/003; B64F 5/60
See application file for complete search history.

(56) References Cited

U.S. PATENT DOCUMENTS

| | | | |
|---|---|---|---|
| 8,346,881 B1* | 1/2013 | Cohen ................. | G06Q 10/107 709/206 |
| 2010/0253541 A1* | 10/2010 | Seder .................... | G01S 13/723 340/905 |
| 2010/0287601 A1 | 11/2010 | Croize | |
| 2015/0261379 A1* | 9/2015 | Kneuper .............. | G08G 5/0052 345/173 |
| 2016/0065497 A1* | 3/2016 | Coulmeau ............ | H04L 47/821 709/203 |

FOREIGN PATENT DOCUMENTS

| | | |
|---|---|---|
| FR | 2 841 999 A1 | 1/2004 |
| FR | 2 916 068 A1 | 11/2008 |

* cited by examiner

*Primary Examiner* — Jess Whittington
(74) *Attorney, Agent, or Firm* — Baker Hostetler LLP

(57) ABSTRACT

A method for managing avionic data between a flight management system FMS and one or more clients, the FMS comprising resources accessible through avionic services Ci (1,n); the execution of the Ci (1,n) determining an avionic functionality Fj (1,m); each of the Fj (1,m) associated with an intrusiveness parameter $I_k$ and a criticality parameter $C_k$; the method comprises the steps of receiving a request specifying the call to an Fj (1,m); and determining a predefined execution right for a Ci (1,n), dependent on the predefined intrusiveness and/or criticality parameters associated with the Fj (1,m). Developments describe particularly the comparison of the execution rights, notice of a rejection, various avionic services and functionalities, the management of criticality ranges, consideration of the flight context, etc. Software and system aspects are described (e.g. equipment of EFB type).

11 Claims, 9 Drawing Sheets

|  | 601<br>D1<br>(=C1a+C1b) | 602<br>D2<br>(=C1a+C2b+C1b) | 603<br>D3<br>(=C1a+C2a+C2b+C1b) |
|---|---|---|---|
| F1<br>Man/machine interface |  |  | X |
| F2<br>Automatic aircraft guidance | X |  |  |
| F3<br>Flight and trajectory surveillance and monitoring | X |  |  |
| F4<br>Contact with air traffic and operational control centers |  | X |  |
| F5<br>Strategic decision making and flight optimization tools |  | X |  |
| F6<br>Flight simulation |  |  | X |
| F7<br>Operational maintenance and preparation |  |  | X |
| F8<br>Ground & flight development | X |  |  |
| F9<br>Failure analysis and flight recorder | X |  |  |

FIG. 6

|  | X1 >= FMS | X2 = FMS | X3 < FMS | X4 << FMS |
|---|---|---|---|---|
| 701 — F1<br>Man/machine interface |  | X |  |  |
| 702 — F2<br>Automatic aircraft guidance | X |  |  |  |
| F3<br>Flight and trajectory surveillance and monitoring | X |  |  |  |
| 703 — F4<br>Contact with air traffic and operational control centers |  |  | X |  |
| F5<br>Strategic decision making and flight optimization tools |  |  | X |  |
| F6<br>Flight simulation |  |  |  | X |
| F7<br>Operational maintenance and preparation |  |  |  | X |
| F8<br>Ground & flight development |  |  |  | X |
| F9<br>Failure analysis and flight recorder |  |  |  | X |

FIG. 7

|  | Criticality | | | | | Access rights | | |
|---|---|---|---|---|---|---|---|---|
|  | X1 | X2 | X3 | X4 | | D1 | D2 | D3 |
| F1 - Man/machine interface |  | X |  |  |  |  |  | X |
| F2 - Automatic aircraft guidance | X |  |  |  |  | X |  |  |
| F3 - Flight and trajectory surveillance and monitoring | X |  |  |  |  | X |  |  |
| F4 - Contact with air traffic and operational control centers |  |  | X |  |  |  | X |  |
| F5 - Strategic decision making and flight optimization tools |  |  | X |  |  |  | X |  |
| F6 - Flight simulation          *Nonoperational |  |  |  | X |  |  |  | X* |
| F7 - Operational maintenance and preparation   *Nonoperational |  |  |  | X |  |  |  | X* |
| F8 - Ground & flight development |  |  |  | X |  | X |  |  |
| F9 - Failure analysis and flight recorder |  |  |  | X |  | X |  |  |

OPEN ARCHITECTURE FOR FLIGHT MANAGEMENT SYSTEM

CROSS-REFERENCE TO RELATED APPLICATIONS

This application claims priority to foreign French patent application No. FR 1502677, filed on Dec. 23, 2015, the disclosure of which is incorporated by reference in its entirety.

FIELD OF THE INVENTION

The invention lies in the technical field of onboard systems, and more particularly in the technical field of avionic systems of FMS (flight management system) type.

BACKGROUND

In the field of avionics, architectures are generally defined in a static manner.

By way of example, when a flight management system FMS is designed, each realtime avionic subsystem is structured and developed to meet performance (RAM, ROM, failure rate, CPU, etc.) and functional quality of service (QoS) demands in a well-defined scope of use. The interactions between systems ("systemic interactions") are defined a priori when the airplane architecture is developed, and systems are generally developed and adjusted to meet the strict need for interaction as defined initially.

When it is necessary to progress the architecture, devices whose functions need to be modified need to be "qualified" again, which gives rise to high certification costs. The addition or modification of a "technical function" engenders very costly requalification (it is necessary to prove the performance of the overall system again, even when no "operational function" is modified). It is a general requirement for the architecture and the interfaces to be iterated.

These iterations and requalification costs currently check the progression of onboard systems in terms of avionics. The upgradability of the various systems is in fact limited in time, because progressions by a system (client or server) cannot give rise to a challenge to all of the connected systems for economic reasons. More broadly, these considerations influence the management of development cycles for the onboard hardware and software, the variability and the standardization of components, etc. Corrective rebounds can be costly. Interconnection with new external avionic systems (additionally or as a substitute and not directly compatible with the previous ones) can bring about additional costs, systemic risks and the introduction of further delays.

In this general context, one of the technical problems to be solved consists particularly in finding a means of organizing the development of a flight management system architecture, efficiently and economically.

Patent document FR2841999 entitled "OBJECT-ORIENTED SYSTEM FOR NETWORKING ONBOARD AERONAUTICAL EQUIPMENT" discloses a system for networking aeronautical equipment onboard an aircraft comprising, for each item of equipment, an object-oriented interface with object front means, enabling it to recognize the onboard equipment to which it is assigned, as an object, in the object-oriented programming sense, capable of communicating with other objects in the object-oriented programming sense according to an object-oriented client/server model and with observer means recording events resulting from operation of the onboard equipment. This object-oriented approach is advantageous but has limitations.

There is a need for flexible and evolving flight management system FMS architectures.

SUMMARY OF THE INVENTION

The invention concerns a method for managing avionic data between a flight management system FMS and one or more clients, the FMS comprising resources accessible through avionic services Ci (1,n); the execution of the Ci (1,n) determining an avionic functionality Fj (1,m); each of the Fj (1,m) being associated with an intrusiveness parameter $I_k$ and a criticality parameter $C_{k'}$; the method comprising the steps consisting of receiving a request specifying the call to an Fj (1,m); and in determining a predefined execution right for a Ci (1,n), dependent on the predefined intrusiveness and/or criticality parameters associated with the Fj (1,m). Developments describe particularly the comparison of the execution rights, notice of a rejection, various avionic services and functionalities, the management of criticality ranges, consideration of the flight context, etc. Software and system aspects are described (e.g. equipment of EFB type).

Advantageously, the invention takes advantage of advanced computing techniques. If the computing techniques on which the invention is based can be known in an individual manner, then they are not so in combination, and a fortiori in the technical field of avionics. In a superficial manner, the transposition or adaptation of known computing techniques to the field of avionics may appear natural and not pose any major difficulty; in reality, it is nothing of the sort. The application context, in this case avionics, is very demanding. A great number of parameters influence the choice of the design of a computing architecture implemented in an aircraft. The constraints are particularly of a statutory nature, that is to say at least indirectly of a technical nature, since the safety of an aircraft transporting potentially hundreds of passengers is a very complex technical matter. In avionics, flight management systems FMS are certified by the FAA (Federal Aviation Administration). If statutory requirements define the space for possible techniques, then they need to be interpreted in technical terms (this task in itself requires an inventive step to be performed) and the "residual" technical possibilities continue to be highly numerous. The peripheral developments around a regulated or certified avionic core frequently return to the situation of the "problem invention" (a situation in which duly posing the technical problem constitutes the main inventive challenge). Incorrect analysis of the inventive step can also be performed a posteriori.

Even if the computing techniques cross numerous technical fields, a person skilled in the art of avionics is not, for all that, omniscient or omnipotent, that is to say apt to apply and/or capable of applying all of these techniques to his specific technical field of avionics. In conclusion, the inventiveness of the application of computing techniques, which may be known elsewhere, to the specific context of avionics needs to be considered with great care.

Advantageously, the architecture described according to the invention makes it possible to reinforce computer security for avionics (in particular) and flight safety of the aircraft (in general). In a general manner, the invention makes it possible to finely control access to critical functionalities of a flight management system. Particularly contemporary threats are taken into account in particular (e.g. sabotage, partial takeover, other forms of piracy). Governing risks of a systemic nature is specific as regards avionics, and the choices of architectures that are described at present also, besides statutory requirements, respond to these security advantages.

Advantageously and in a counter-intuitive manner, the method according to the invention does not consider the certified flight management system FMS to be a "monolithic" system (in the sense of a rigid and/or nonmodifiable system) but rather considers it to be a system that can be structured so as to allow a certain access granularity (certain requirements particularly linked to certification or regulation will be met while the identification of room for maneuver for other requirements will be used to allow the addition of flexibility at the periphery of this "monolithic" system). The embodiments of the invention apply in an advantageous manner, that is to say in a specific contextual manner, the approaches consisting in considering a given system in an "atomic" manner or in accordance with an "object" approach.

Advantageously, the classification of the functions of the flight management system according to their criticality and/or intrusiveness allows configurable and flexible management.

Advantageously, this organization into layers ("decoupling", "segregation") allows the functional and/or technical avionic capabilities provided by the functional core of the flight management system FMS to be reused in order to realize or implement new operational avionic functionalities, while limiting the adaptation effort required for implementing the new interaction model and/or the new input/output (I/O) protocols. The "operational" functions (or data) of a system denote the functions (or data) of a system that perform an operational (e.g. concrete, tangible, measurable) "service" in response to a request communicated to this system (whether the request comes from the pilot directly or indirectly, or else from a third-party system). The "technical" functions (or data) are the functions (or data) that are necessary in order to perform one or more support functions, such as parameterization, configuration, supervision, observation and injection of data, or that are required for installation, configuration of the system, startup thereof, but also development thereof, acceptance thereof or even failure analysis, whether under real or simulated conditions. The data or functions may be volatile (inputs and outputs) or nonvolatile (e.g. storage of configuration, parameterization, etc. information).

Advantageously, structuring into layers allows the functional avionic capabilities and the technical avionic capabilities provided by the functional core of the system to be reused in order to realize new operational avionic functionalities while limiting the effort for adaptation to the implementation of the new interaction model and/or the new I/O protocols required within this context. By way of example, the addition of a new avionic functionality consisting in being able to work on existing capabilities of the system through a new remote means will have impacts confined "at the periphery" of the functional core. Moreover, given that these new operational functions will not have, for some, the same level of criticality ("safety") as that of the functional avionic core, it is possible to apply a level of quality assurance for variable development to the implementation of the new interaction model and/or the new protocols required in this context, for example by accommodating it in its own partition (for example A653), still without impact on the functional core insofar as the existing functional or technical capabilities can be reused, and on condition that access to these capabilities is open. In other words, explicit and rigorous management of this segregation between the four different parts generally making up the system according to the invention makes it possible to cancel out the potential impacts on the functional core of changes relating to one or more components of the three other aspects of the system (interaction model, protocols, connected systems, information, configuration and parameterization system, host platform).

Advantageously, the method makes it possible to configure a quality of service (QoS) and to manage the access privileges of clients, for example in order to optimize by equivalence class the efforts for recertification of the functional core.

Advantageously, the embodiments of the invention make it possible to provide more upgradability for the various operational or technical functions, in an independent manner. Furthermore, progressions on the functional core of the flight management system FMS are introduced only as a last resort and only when a new algorithmic capability is required.

Advantageously, in a particular embodiment of the invention (onboard realtime environment), the subsystems can be associated with different levels of criticality. In this context, the reason is that it is advantageous to modify critical systems acting as servers as little as possible, taking account of the costs and risks of degradation of said systems.

Advantageously, the creation or management of a separate system in order to manage the technical functions makes it possible to better adjust the processor load of the functional core of the flight management system.

Advantageously, the creation or management of a separate system in order to manage the technical functions makes it possible to minimize iteration of the code of the functional core of the flight management system if need be.

Advantageously, the embodiments of the invention improve flight safety for the aircraft by filtering the intrusiveness of clients that have a low level of qualification (and that risk causing errors, for example).

Advantageously, the embodiments of the invention apply to various functions of the onboard FMS computer. In an ATA system, "flight management" is part of "navigation" and concerns ATA 22 and ATA 34. In aeronautic terms, the navigation systems provide the services and functions for location, flight planning, trajectory management, aircraft guidance (e.g. servo controls), aircraft flying and a variety of systems for assisting in decision making or algorithms allowing optimization of the assignment (e.g. choice of the most suitable rerouting airports, optimizations of the lateral or vertical trajectory in order to use favorable winds, etc.).

Advantageously, the modular architecture according to the invention can be extended: its component elements can be distributed in various avionic devices in order to optimize development and certification efforts downstream. Some embodiments of the invention allow, by way of example, interconnection with other external systems (for example in addition to or as a substitute for existing equipment, which would possibly not be directly compatible with the existing equipment). Some embodiments of the invention allow the implementation of new models and protocols for interaction with the functional core. Embodiments of the invention allow the introduction of new operational functionalities.

BRIEF DESCRIPTION OF THE DRAWINGS

Other features and advantages of the invention will emerge with the aid of the description that follows and the figures of the appended drawings, in which:

FIG. 6 illustrates an example of classification of the access rights by operational avionic functionalities;

FIG. 7 illustrates an example of classification of the operational avionic functionalities on the basis of their level of criticality (allocation of the functions by criticality);

FIG. 8 presents an example of correlation between the levels of criticality and the access rights for the avionic services;

DETAILED DESCRIPTION

The invention particularly describes various embodiments of an open architecture. This open architecture is particularly exposed through programming interfaces allowing access (by variable means) to the avionic services of the certified and regulated flight management system.

In one embodiment, the architecture comprises a flight management system according to the invention ("open" FMS) that comprises four interacting parts: a) a functional avionic core, that is to say a system subset that implements the functional services and the avionic services of the flight management system, b) an interaction model (and versions thereof) and protocols allowing an external operator to request the functional core, c) an information system allowing the data or the connections to be managed and d) the hardware platform for executing the various services.

Figure 1:
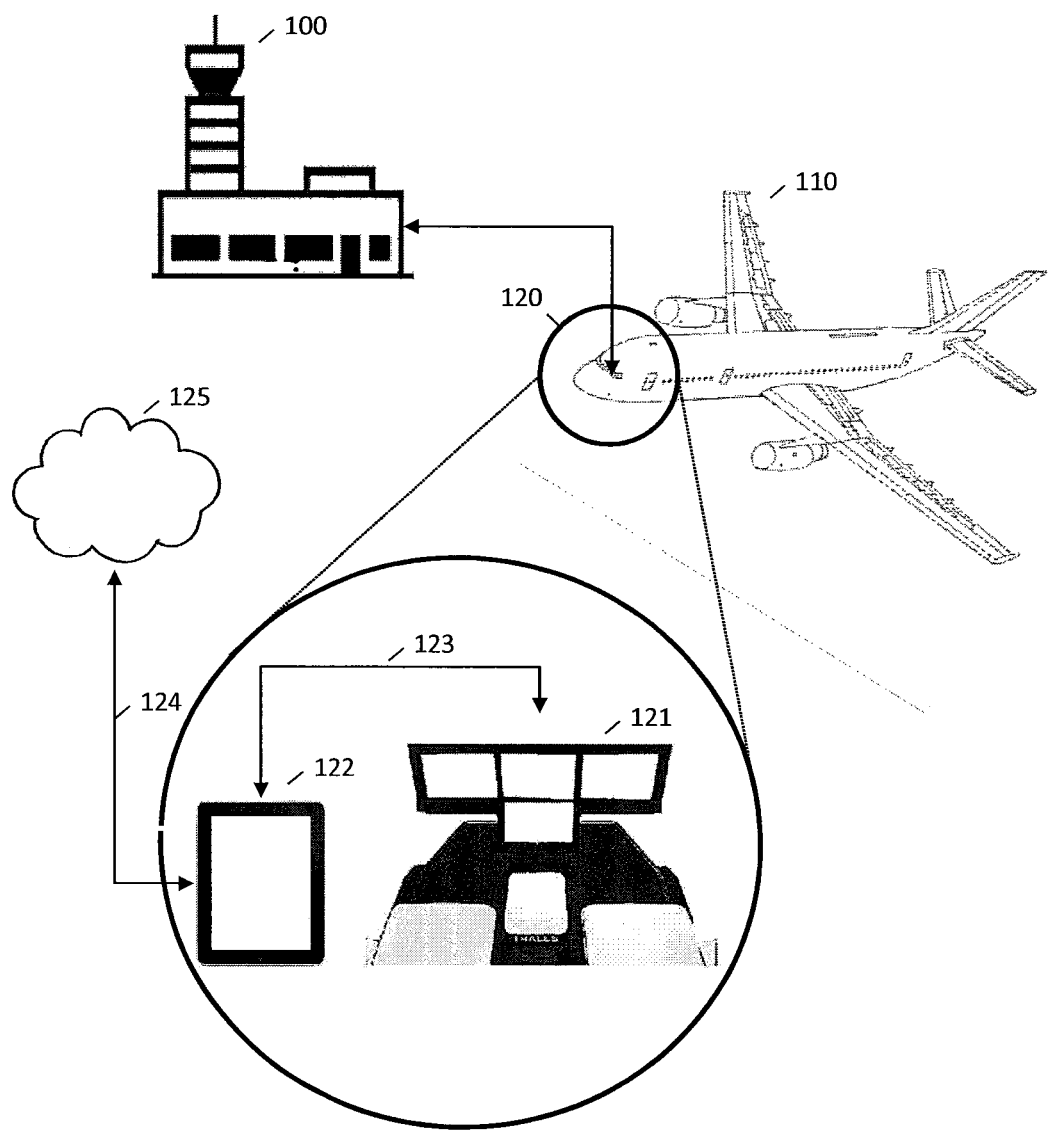
FIG. 1 illustrates the overall technical environment of the invention.

FIG. 1 illustrates the overall technical environment of the invention. Avionic equipment or airport means 100 (for example a control tower in contact with the air traffic control systems) is/are in communication with an aircraft 110. An aircraft is a means of transport capable of progressing in the earth's atmosphere. By way of example, an aircraft may be an airplane or a helicopter (or even a drone). The aircraft comprises a flight deck or cockpit 120. The cockpit contains flying equipment 121 (known as avionic equipment), for example comprising one or more onboard computers (computation, memory storage and data storage means), including an FMS, display or visual display and data capture means, communication means, and (possibly) haptic feedback means. A tablet or an EFB 122 (electronic flight bag) may be onboard, in portable form or in a manner integrated into the cockpit. An EFB is sometimes referred to or is described as being a piece of equipment of "open (world)" type as opposed to equipment of "avionic" type (certified by the regulator). Said EFB can interact (bilateral communication 123) with the avionic equipment 121. The EFB may also be in communication 124 with external computing resources, accessible via the network (for example cloud computing 125). In particular, calculations can be performed locally on the EFB or partly or totally in the computation means accessible via the network. The onboard equipment 121 is generally certified and regulated, whereas the EFB 122 and the connected computing means 125 are generally not (or to a lesser extent) so. This architecture makes it possible to inject flexibility from the EFB 122 while ensuring safety controlled by the onboard avionics 121.

Figure 2:
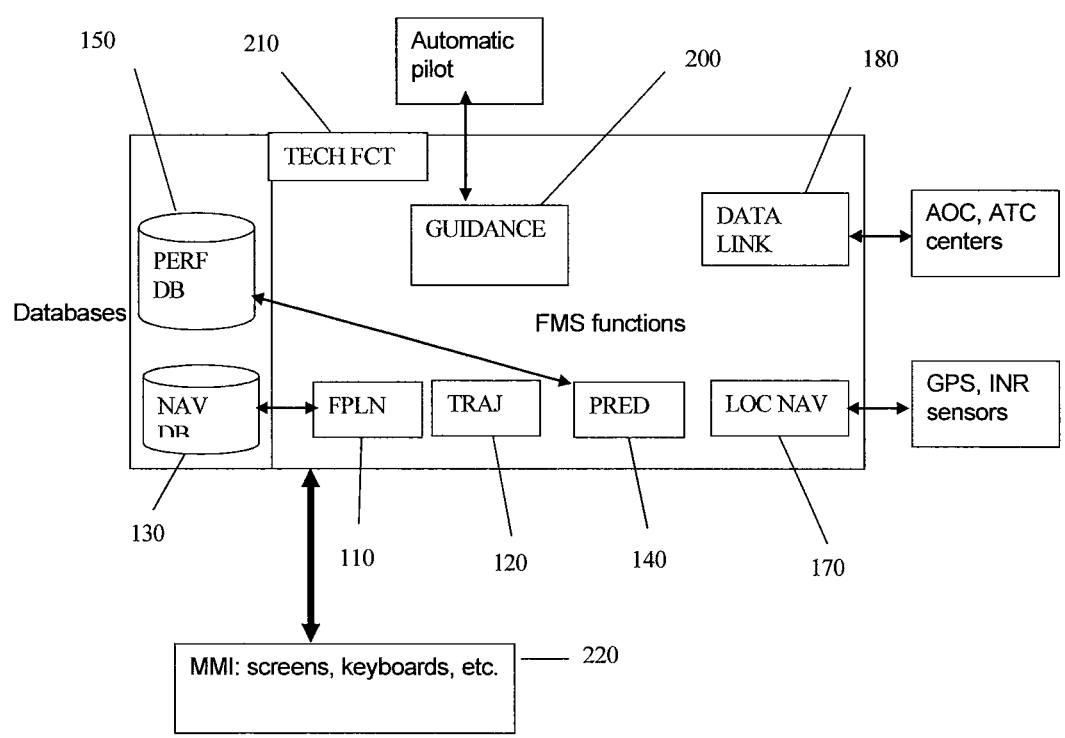
FIG. 2 schematically illustrates the structure and functions of a flight management system of known FMS type.

FIG. 2 schematically illustrates the structure and the avionic functions of a flight management system of known FMS type.

The FMS is generally connected to numerous other computers (a hundred or so), which can also implement one or more steps of the method according to the invention (for example the management of conditional access to granular avionic services can advantageously reinforce sparse avionic resources). In current architectures (whatever the airplane), the "flight planning" and "optimized trajectory" part is generally included in a dedicated computer called "FMS" for "flight management system" (or flight management computer). These functions make up the core business "flight management". This system can also accommodate some of the "location" and "guidance".

FIG. 2 represents an FMS having avionic functions of:

navigation LOCNAV, 170, to perform optimum location of the aircraft on the basis of the geolocation means (GPS, GALILEO, VHF radio beacons, inertial units);

flight plan FPLN, 110, in order to capture the geographical elements making up the skeletal structure of the route to be followed (departure and arrival procedures, waypoints, airways);

navigation database NAVDB 130, in order to construct geographical routes and procedures from data included in the bases (points, beacons, interception or altitude legs, etc.);

performance database, PRF DB 150, containing the aerodynamic and engine parameters of the aircraft;

lateral trajectory TRAJ, 120: in order to construct a continuous trajectory from the points on the flight plan, observing airplane performance and confinement constraints (RNAV, RNP, etc.);

predictions PRED, 140: in order to construct an optimized vertical profile on the lateral trajectory;

guidance, GUID 200, in order to guide the aircraft on its 3D trajectory in the lateral and vertical planes, while optimizing speed;

digital datalink DATALINK, 180, in order to communicate with the control centers and other aircraft;

technical functions, 210, in order to manage the nonfunctional aspects of the FMS: observability, DUAL, recording of failures, startup, simulation mode, flight tests, etc.;

management of the (pilot) man/machine interface MMI 220.

The functions of the flight management system FMS can be classified into nine function types (F1 to F9). In the example illustrated, the function F1 (man/machine interface) is implemented in the block 220 (MMI). The function F2 corresponds to automatic guidance of the aircraft and is implemented in the block 200 (GUIDANCE). The function F3, which corresponds to flight and trajectory surveillance and monitoring, is implemented in the block 110 (FPLN), 120 (TRAJ) and 140 (PRED). The function F4, which corresponds to contact with air traffic and operational control centers, is implemented in the block 180 (DATALINK). The function F5, which corresponds to strategic decision making tools, to flight optimization, is implemented in the blocks 120 (TRAJ) and 140 (PRED). The function F6, which corresponds to flight simulation, is implemented in the block 210 (TECH FCT). The function F7, which corresponds to maintenance and operational preparation, is implemented in the block 210 (TECH FCT). The function F8, which corresponds to ground & flight development, is implemented in the block 210 (TECH FCT). The function F9, which corresponds to failure analysis and flight recorder, is implemented in the block 210 (TECH FCT).

Various embodiments of the invention are described below.

A method for managing avionic data between a flight management system FMS and one or more clients of said FMS is disclosed, the flight management system FMS comprising physical resources accessible through avionic services Ci (1,n); the execution of one or more avionic services Ci (1,n) determining an avionic functionality Fj (1,m); each avionic functionality Fj (1,m) being associated with an intrusiveness parameter $I_k$ and a criticality parameter $C_k$; the method comprising the steps consisting of receiving a request from a client, said request specifying the call to an avionic functionality Fj (1,m); and determining a parameter associated with a predefined execution right for an avionic service Ci (1,n), said parameter being dependent on the predefined intrusiveness and/or criticality parameters associated with said avionic functionality Fj (1,m).

The intrusiveness and/or criticality parameters are associated with a functionality of the flight management system.

The method according to the invention decouples the flight management system from the clients of this system.

The "decoupling interface" is provided by management of an intermediate layer between the FMS and the client, allowing or prohibiting calls to the computing resources.

In one embodiment, the management of access to the resources is "binary": access is authorized or it is not.

In one embodiment of the invention, the management of access is governed by one or more priorities (predefined or dynamically defined).

In one embodiment of the invention, the method allows active management of access to the resources. Active management can comprise an inhibition mechanism (e.g. lowering of the associated priority, unfavorable weighting) and/or a promotion mechanism (e.g. raising of the associated priority, favorable weighting, etc.).

According to one aspect of the invention, the definition and consideration of various abstraction layers allows optimized management of hardware and/or software resources. Hardware resources are accessed by unitary FMS codes, which define FMS "functionalities". These functionalities are called by one or more requests from one or more clients of the flight management system FMS.

In a development, the method further comprises the step consisting in comparing the determined execution right parameter with one or more predefined execution rights.

The method comprises a step consisting in determining a matrix of rights for execution Di of a service Ci by a functionality Fi on the basis of the intrusiveness and/or criticality parameters. When a client commands the execution of a function headed for the digital core, the decoupling interface checks the execution rights.

In a development, the method further comprises a step consisting in executing one or more avionic services and communicating the result to the client.

In a development, the method further comprises the step consisting in notifying the client of the rejection of its request.

In a development, an avionic service corresponds to an avionic service selected from among an avionic service for accessing the information system of the functional core of the FMS, an avionic service for flight plan management or administration, an avionic service for accessing the data of a flight plan or of a trajectory of the aircraft.

In a development, a level of criticality is selected from among a plurality of predefined criticality ranges.

In a development, the plurality of criticality ranges comprises four predefined criticality ranges, which comprise a level of criticality X1 strictly higher than the level of criticality of the functional core FMS, the level of criticality X2 equal to the level of criticality of the functional core FMS, the level of criticality X3 strictly lower than the level of criticality of the functional core FMS and the level of criticality X4 much lower than the level of criticality of the functional core FMS.

The definition of four criticality classes is found to be advantageous in operational aeronautic practice. In other words, there is an optimum of four clients implementing the interactions with external systems in order to realize subsets of homogeneous avionic functionalities per client, in terms of criticality, as in terms of access rights.

In a development, an avionic functionality is selected from among the avionic functionalities comprising a man/machine interface functionality F1, an automatic aircraft guidance functionality F2, a flight and trajectory surveillance and monitoring functionality F3, an air traffic and operational control centers contact functionality F4, a strategic decision making or flight optimization tool functionality F5, a flight simulation functionality F6, a maintenance and operational preparation functionality F7, a ground & flight development functionality F8, a failure analysis and flight recorder functionality F9.

In a development, an avionic functionality is accessed and/or executed by one or more user interfaces (or MMIs, for "man/machine interface") according to a predefined interaction model. An avionic functionality advantageously uses an interaction model executing one or more interfaces (user interfaces or MMIs in the broad sense) specifically called by an external operator and using one or more avionic services of the functional core.

An interaction model realizes a set of principles, rules and properties that govern the operation of a man/machine interface. An MMI may be, by way of example, a graphical interface, but not solely. An MMI can combine various means of restoration and audio, visual or other sensory interactions (touch, force feedback, Braille, or even olfactory, etc.). An MMI can be in 2D, in 3D, with or without haptic feedback, etc.). An interaction model is generally predefined (that is to say determined when the interface is designed). An interaction model generally corresponds to the generalization of a user interface; the various versions of the interaction model particularly correspond to predefined use contexts (i.e. specific successions of display screens, types of displayed symbols, specific priorities allocated to certain types of information, etc.), which may particularly be dependent on the flight context. The predefined avionic interaction model according to the invention is chosen from among the interaction models comprising a man/machine interaction model (in a generic manner) and/or an interaction model comprising automatic aircraft guidance known as (which can imply a specific interface) and/or onboard surveillance, an interaction model known as ATM/Airlines Operation Center and/or an interaction model known as Simulation/Maintenance/Development/Failure analysis (which corresponds to a specific context as its name indicates).

In a development, the intrusiveness and/or criticality parameters are configurable.

Access rights are associated with each of these operational functionalities. These rights authorize or do not authorize, for the family in question, the use of a subset of the capabilities and the manipulation of a subset of the data of the functional core. The family to which an connected system belongs is a piece of information that is configurable (by the pilot and/or the company and/or a third-party avionic system).

In a development, one or more intrusiveness and/or criticality parameters are dependent on the flight context.

The flight context of the aircraft particularly comprises the phases of takeoff, ascent, cruise, approach, descent, etc. Advantageously, taking into account the flight context in order to determine the intrusiveness and/or criticality of accesses to the avionic core makes it possible to optimize the use and performance thereof.

The method according to the invention may comprise logical methods or steps allowing the "flight context" or "current flight context" of the aircraft to be determined.

The flight context at a given moment integrates all of the actions taken by the pilots (and particularly the actual flying instructions) and the influence of the outside environment on the aircraft. A "flight context" comprises, by way of example, a situation from among predefined or precategorized situations associated with data such as position, flight phase, waypoints, the procedure in progress (and others). By way of example, the aircraft may be in the approach phase for landing, in the takeoff phase, in the cruise phase but also at an ascending stage, descending stage, etc. (a variety of situations can be predefined). Moreover, the current "flight context" may be associated with a multitude of attributes or descriptive parameters (current meteorological condition, state of the traffic, status of the pilot, for example comprising a stress level as measured by sensors, etc.).

A flight context may therefore also comprise data, for example filtered by priority and/or based on flight phase data, meteorological problems, avionic parameters, ATC negotiations, abnormalities linked to the status of the flight, problems linked to traffic and/or to the landscape. Examples of "flight context" comprise, by way of example, contexts such as "cruise speed/no turbulence/nominal pilot stress" or even "landing phase/turbulence/intense pilot stress". These contexts can be structured according to various models (e.g. hierarchically organized, by way of example, as a tree or according to different dependences, including graphs). Categories of contexts can be defined, so as to synthesize the needs in terms of man/machine interaction (e.g. minimum or maximum interaction time, minimum and maximum quantities of words, etc.). There may also be specific rules in certain contexts, particularly emergencies or critical situations. The categories of contexts may be static or dynamic (e.g. configurable).

The method can be implemented in a system comprising means for determining a flight context of the aircraft, said determination means comprising logic rules, in particular, which manipulate values as measured by physical measurement means. In other words, the means for determining the "flight context" comprise system or "hardware" or physical/tangible means and/or logical means (e.g. logic rules, for example predefined logic rules). By way of example, the physical means comprise the avionic instrumentation in the literal sense (radars, probes, etc.), which allow factual measurements characterizing the flight to be established. The logic rules represent all of the information processing operations allowing the factual measurements to be interpreted (e.g. contextualized). Some values may correspond to multiple contexts and, by correlation and/or computation and/or simulation, it is possible to decide between candidate "contexts", by means of these logic rules. A variety of technologies makes it possible to implement these logic rules (formal logic, fuzzy logic, intuitionistic logic, etc.).

Various regulations of the system according to the invention are possible, in a supervised manner (for example controlled by an operator) or in an unsupervised manner (for example initially parameterized). In one embodiment, one or more learning mechanisms ("machine learning") can regulate accesses to the avionic core (for example by inhibiting or promoting certain interactions and/or clients). In some embodiments, the regulation of accesses to the FMS avionic core can comprise active/passive interaction schemes, voting mechanisms (between pairs), etc.

A computer program product is disclosed, said computer program comprising code instructions allowing one or more of the steps of the method to be performed when said program is executed on a computer.

A system comprising means for implementing the steps of the method is disclosed.

In a development, the system comprises a flight management system FMS and one or more clients of said flight management system FMS.

In a development, the system comprises at least one electronic flight bag of EFB type. In fact, in a development of the invention, the system for implementing the method comprises at least one piece of equipment of "open world" type. A piece of equipment from the open world may be, by way of example, an electronic flight bag (EFB or tablet). This equipment of "open world" type may moreover be physically outside the cockpit: by way of example, the commercial personnel could access certain services through APIs using the means of the invention. In other embodiments, passengers can also access certain services (as well as services on the ground).

Figure 3:
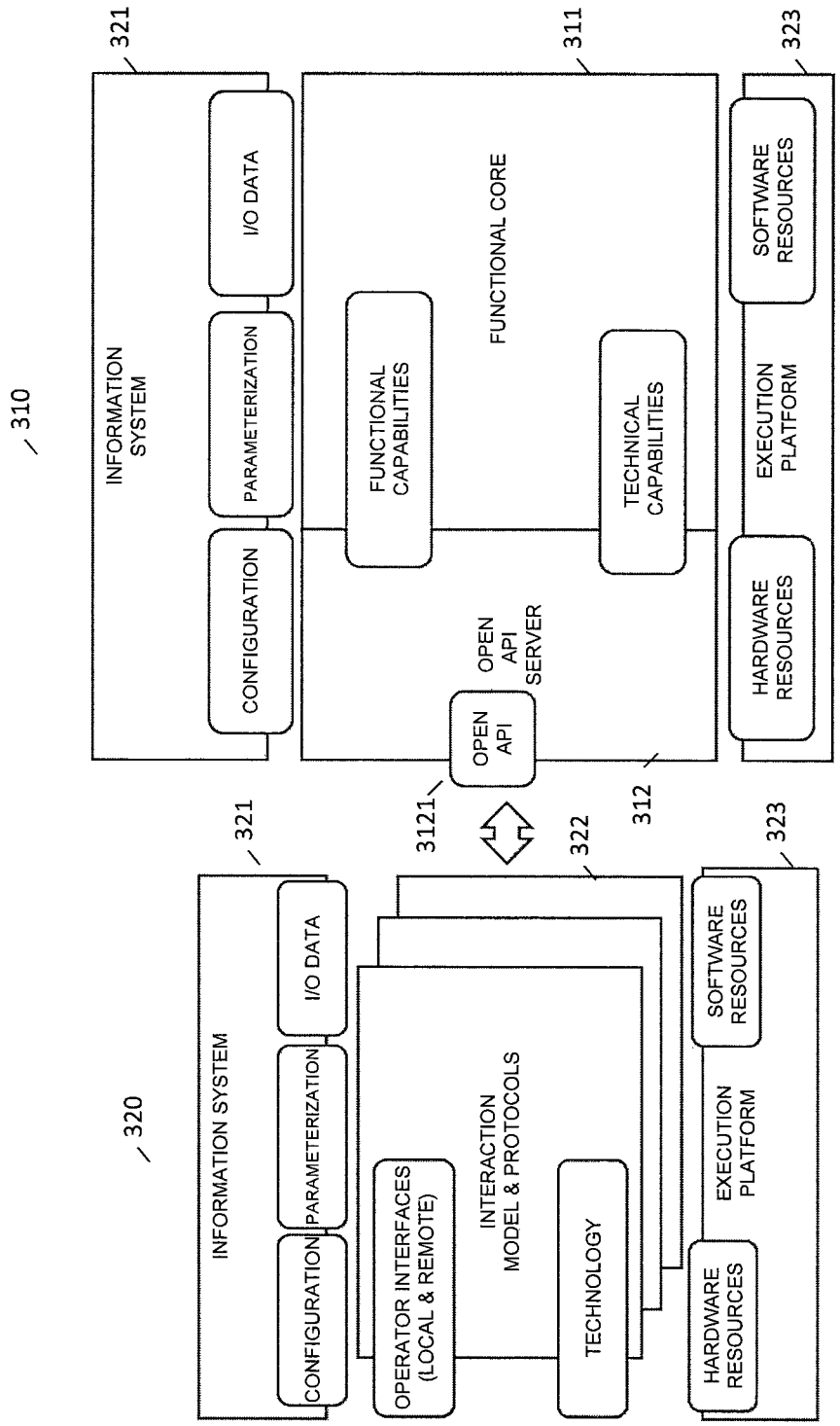
FIG. 3 illustrates aspects of an embodiment of the invention.

FIG. 3 illustrates aspects of an embodiment of the invention.

A device for dialog between a flight management system "FMS OPEN" and at least one client external to said flight management system is disclosed, including a "decoupling interface" between the flight management system and the client.

A client 320 of the "open" FMS 310 comprises at least one avionic functionality characterized by at least one intrusiveness parameter and a criticality parameter.

The notion of "intrusion" bears witness to an expression of wanting to reserve access to physical or logical resources for certain previously denoted systems. The notion of intrusion also presupposes that one or more limits of a predefined system have been crossed. The term "intrusiveness" refers to this term "intrusion", with which it associates a quantization (e.g. various gradations). In other words, the various third-party systems connected to the flight management system are not trusted a priori. In one embodiment of the invention, any connected third-party system is likely to compromise (or to corrupt or to cause any other type of failure or fault or overload) the avionic core. In one embodiment of the invention, full trust is accorded to any connected third-party system. In intermediate embodiments, the trust accorded to the connected third-party system is variable; this trust and therefore the associated access rights can particularly change over the course of time ("time-driven") and/or on the basis of events ("event-driven").

In mathematics, the value taken by a function at a critical point is called a critical value. A critical point is used as an intermediary for looking for an extreme of a function. In computing, a critical system is a system in which failure can have serious consequences, including significant hardware failures or damage (with an impact on the safety of the flight of the aircraft). The notion of "criticality" also introduces a quantization for this critical character by associating various "stages" or "attributes" or "levels" therewith.

According to the invention, advantageously as regards risk management, the crossing of the levels of "criticality" and "intrusiveness" makes it possible to structure an avionic system with improved security and safety.

The ("open") flight management system 310 is made up of a digital avionic core 311 ("functional core"), a front 312 ("OPEN API SERVER"), said front comprising a list of stereotypical avionic services, that is to say services whose structure and functions are known.

The decoupling interface 320 comprises an information system 321, an "interaction model and protocols" 322 and an execution platform 323.

The information system 321 provides i) the storage mechanisms and the storage location for the configuration (general modes and options for operation) and/or parameterization (nonvolatile functional data) information, ii) the functional data at the input and/or at the output of the system (volatile functional data), iii) the type and/or number of connected systems and the associated interchange protocols and iv) the physical format of interchanges of information (I/O) between the system or the various connected systems.

The interaction model 322 and the protocols used by this external operator make it possible to request the operational functions of the system and the support functions (parameterization, download, observation, injection of data). By way of example, the user interface may be implemented locally in the avionic system or else accessible for another remote system. Consequently, multiple user interfaces are simultaneously possible (or else there may be multiple different instances of the same interface).

The decoupling interface 322 computes a matrix of the rights of execution of an avionic service by a functionality on the basis of the intrusiveness parameters and a criticality parameter. When a client commands the execution of an avionic function headed for the digital core, the decoupling interface checks the execution rights. If the rights are accorded, the decoupling interface commands the execution of the avionic services by said front, and possibly notifies the client of the result. If the rights are not accorded, the decoupling interface possibly notifies the client of the rejection.

The functional avionic core 311 implements the functional and technical avionic capabilities that are stable, necessary and sufficient for the operational functionalities. The functional avionic core of the system 311 is the subset of the system that implements a) the functional avionic capabilities necessary for realizing the "operational" functions (those that perform an operational service for an external operator taking action on the system, whatever the method used to take action on the system) and b) the avionic technical capabilities necessary for realizing the support functions such as parameterization, configuration, supervision, observation and injection of data, which are required for the installation, the configuration of the system, startup thereof, but also development thereof, acceptance thereof or even failure analysis (whether under real or simulated conditions).

The execution platform 323 comprises hardware aspects (instructions, cache management, physical addressing of memory and I/O resources) and software aspects (operating system, input/output drivers, logical addressing, etc.).

In one embodiment, the method uses exposure of the functional avionic core 311 of the FMS through one or more programming interfaces (APIs) 3121 that are accessible from an API server 312.

In computing, a programming interface (often denoted by the term API for "Application Programming Interface") is a standardized set of classes, methods, functions, types of data and constants that is used as a front by means of which a piece of software provides services for other software. A programming interface is generally provided by a software library or a web service, most often accompanied by a description that specifies how consumer programs can use functionalities of the supplier program. An API may be "private", that is to say intended for computer development use carried out internally. An API may be "open" or "public" (open API): the specifications of the interface may be published, i.e. accessible to the public and particularly to third-party developers.

Within the context of the invention, an "open API" corresponds to the (at least partial) exposure of a (concrete) avionic function and/or of a (theoretical) avionic functionality, in the particularly specific context of avionics, a regulated sector, i.e. one in which the services are certified. In other words, an open API according to the invention is described, accessed, executed and possibly protected using means that are completely specific to and characteristic of the avionic sector.

According to the invention, an API (programming interface) for accessing the functional core of the FMS can be defined with regard to the functional and technical capabilities of the FMS rather than with regard to the mode of operation and the operational scenarios.

In one embodiment, the capabilities of the FMS functional core are exposed through one or more explicit (that is to say documented, for example published) APIs that are usable by third-party clients.

According to the embodiments, the documentation or description of the programming interfaces is more or less complete, in a manner characteristic of the avionic sector. In other words, in some embodiments, the description of the avionic services is complete and exhaustive. In other embodiments, the description or documentation is only partial (some unpublished or intentionally encoded commands make it possible to obtain some information from the FMS, for example particularly critical information). In one embodiment, the description of the avionic services is accessible on demand. In one embodiment, the complete description of an avionic service is encoded, that is to say that the existence of documentation is apparent but that access to the content thereof requires a previously shared secret. In one embodiment, the description and/or the existence of an avionic service is concealed (in the manner of steganography).

With regard to access to the programming interfaces of avionic services, access permissions or restrictions for the various APIs may be specific. Access to a given avionic service may be configurable, for example as regards scale of charges, quantity of calls (volumes), quality of service (e.g. priorities). In one embodiment, accesses may be "free", unlimited in volume and without access restrictions. In other situations, access to some functions of the FMS may be limited (quantity, quality) by access restrictions (access control, keys, encoding, absolute and/or relative priorities). Some embodiments of the invention can combine the use of APIs of "public" type (e.g. published) with the use of APIs of "private" type (e.g. some advantages or privileges can be reserved for internal development or for selected aeronautic partners).

In particular, the life cycle of an API can give rise to various developments (e.g. the stability of some APIs may be guaranteed while that of others can be depreciated ("depreciated API").

In one embodiment, at least one API is open and accessible from another partition or another computer, in order to ensure the distribution of the various elements making up the FMS application, particularly the parts dealing with the information system and the various methods of interaction with the functional core. In other words, management of the redundancy that is characteristic of avionics (dual system, triplication, voting mechanism) may be combined with the management of access rights.

According to the embodiments, various subsets of the functional and technical capabilities of the FMS core can be exposed to the clients through "APIs" as defined above.

These functional and technical capabilities of an avionic nature particularly comprise:
  access to the information system of the functional core (C1a), namely a) the configuration data of the system (operating modes and options), b) parameterization data (navigation database, etc.), c) characteristic data at the input and data and states consolidated by the functional core;
  access to flight plan data (C1b), the 3D trajectory and the associated predictions for all flight plans manipulated by the functional core;
  flight plan administration services (C2a), for example creation, deletion and replication of flight plans;
  flight plan editing services (C2b), according to a variable granularity, from a flight plan point "waypoint" to a set of flight plan points like a navigation procedure or a "company route".

Figure 4:
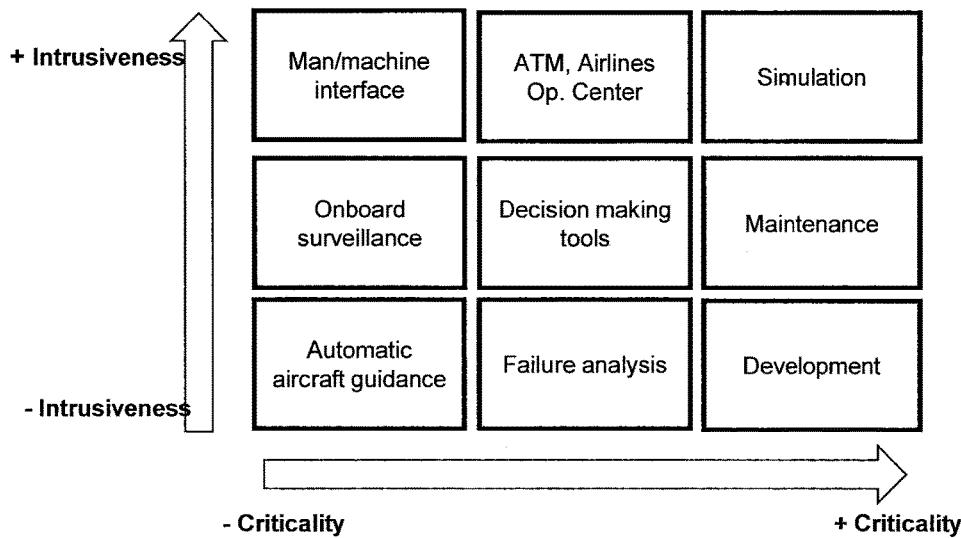
FIG. 4 schematically shows examples of degrees of intrusiveness of various functionalities of the flight management system, derived from their degrees of criticality, according to an embodiment of the invention.

FIG. 4 schematically shows examples of degrees of intrusiveness of various functionalities of the flight management system, derived from their degrees of criticality, according to an embodiment of the invention.

The scope of the avionic functionalities of an FMS may vary over the life of one and the same aircraft. The reason is that these avionic functionalities involve multiple connected systems and the properties of these connected systems (interface, communication protocol, interaction model). A fortiori, the avionic functionalities of the FMS evolve from one generation of aircraft to another. These functionalities have a level of criticality of their own (safety) and require levels of intrusiveness in the functional core that are sometimes very different.

In one embodiment, the variability of the various functionalities (existing or future) of the functional core is "confined". The functional core is then "unique" and "reusable" (which allows significant economies of scale). More generally, the various generations of equipment can lead to particular patterns of the criticality/intrusiveness pairs.

Classification of the functions of the flight management system according to their criticality and/or intrusiveness allows configurable and flexible management.

By way of example, in order to use the capabilities provided by one or more APIs, privileges per client and more generally quality of service may be configurable (i.e. configured).

In one embodiment, the access rights conferred on or associated with a client of the FMS may be dependent on the operational functionalities in question. These rights can allow—or not—the family in question to use a subset of the capabilities of the FMS and to manipulate a subset of the data of the functional core of the FMS.

In a general manner, the family to which a given system connected to the flight management system FMS belongs (determining access properties) is configurable. Access rights or properties may be static. Access rights may also be dynamic, that is to say evolving over the course of time and/or on the basis of flight events (for example on the basis of flight phases, i.e. the flight context). In some embodiments, predefined scenarios at least partially determine the various access rights (e.g. stalling, emergency situation, cruise speed, takeoff/landing).

Access rights can concern access to avionic services and/or to programming interfaces for said avionic services. In other words, access to an avionic service per se and access to the documentation of this same service can be considered independently. By way of example, a client may possibly have access to all available avionic services but without knowing the corresponding descriptions thereof in a detailed manner (other than what is strictly necessary for executing the avionic services). Conversely, a client may have access to a single avionic service but know the full scope thereof (e.g. the limits, for example as regards computation precision, load capabilities, tolerance as regards badly formed requests, the existence of special or emergency commands, etc.).

Advantageously, the various embodiments of the invention make it possible to obtain architectures that are distributed, evolving and optimum in terms of effort for development and certification of the various functionalities, with regard to the various levels of criticality of the implemented operational functions. In one embodiment, the criticality of functionalities is understood in the sense of certification (safety). These operational functionalities (involving multiple systems, including the FMS) can be broken down into i) functionalities corresponding to the implementation of functional or technical capabilities of the functional core, ii) functionalities allowing the implementation of the clients implementing the interaction model(s) and the communication protocols with the connected system(s), for one or more operational functions.

In respect of i), the implementation of functional or technical capability of the functional core is implemented by the functional core and therefore inherits the level of criticality associated with the functional capabilities of the functional core.

In respect of ii), the implementation of the clients of the API or open API inherits the level of criticality of the operational functionality that needs to be realized. In one embodiment of the invention, the clients may therefore have access to dedicated partitions.

Advantageously, development costs are potentially lower if the level of criticality is lower than that of the functional core. Certification funds are maintained and implementation costs remain low if no new functional capability is requested and/or if the field of use of the functional core is kept to.

Figure 5:
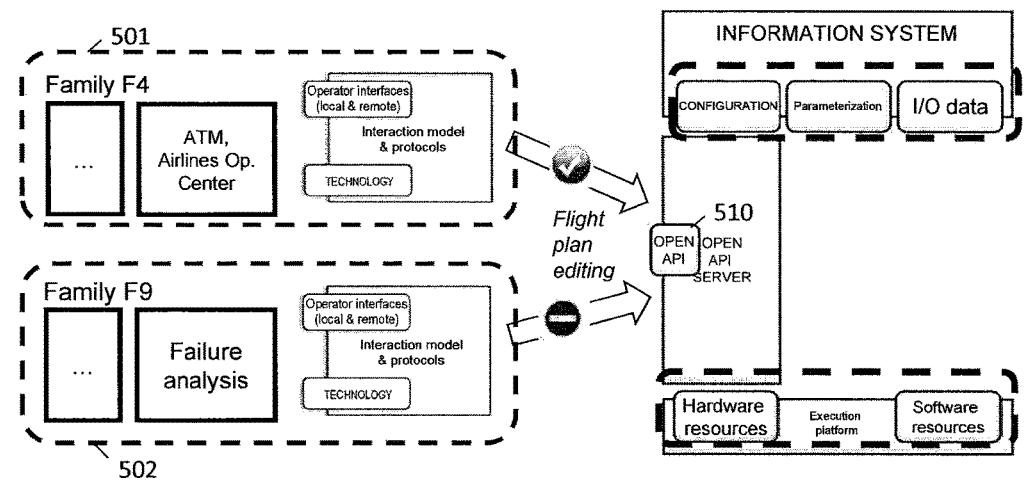
FIG. 5 illustrates an embodiment with specific examples of access rights for various avionic functions of the FMS.

FIG. 5 illustrates an embodiment with specific examples of access rights for the various avionic functions of the FMS.

In the example, the family F4 (contact with air traffic and operational control centers) 501 can edit the flight plan through access to the open APIs 510, while the family F9 (failure analysis and flight recorder) is not able to do this.

FIG. 6 illustrates an example of classification of access rights by operational avionic functionalities. The rights may be:

reading or simple consultation of data (D1 601; "READ ONLY"). In the example provided, this read only consultation right for the data is restricted to the only FMS capabilities C1a and C1b;

writing or editing, for example of the private flight plan (D2 602; RD, "WRITE" on private datum). In the example provided, this editing right is restricted to the capabilities C1a, C1b and C2b;

writing and reading, for example editing and administration of the public flight plan (D3 603; "READ/WRITE" on the data of the functional core). In the example provided, this right is not associated with any restriction.

In one embodiment, each of the clients of the API is considered to be an elementary application implementing the interaction model and the communication protocol between the connected external system(s) and the functional core of the FMS. Each of the clients contributes to realizing one or more operational avionic functions. A quality of service QoS of avionic nature may be defined for each of the clients (or at least some of them). This quality of service makes it possible to define privilege levels between the clients in the processing of their requests (services, access to the data). The avionic quality of service provided for each client is a configurable variable.

In one embodiment, two types of information make it possible to define the field of use of the functional core within the scope of interaction with third-party systems: a) the time quantum allocated, in a fixed manner, to the functional core for processing all of the interactions with the connected systems and b) the maximum number of connected systems for a family of operational functionalities.

In one embodiment, these two types of information make it possible to limit the maximum "envelope" (the scope of the field of use) to which the functional core has to respond.

The subset of hardware resources, software resources and I/O data that is associated with the interactions between each of the connected systems and the functional core is provisioned for these two pieces of information (the term "provision" means providing the appropriate hardware resources, according to an obligation in terms of means or even an obligation in terms of result, i.e. according to guaranteed or at least quantized service levels, "Service Level Agreements").

The validation of the functional core, as regards "behavior" (e.g. set of responses to requests) and in terms of its performance, can be obtained with fixed values for these two types of information, and for a given execution platform. The certification is generally obtained (and maintained) for as long as it is not necessary to progress one of these types of information and/or the reference execution platform.

FIG. 7 illustrates an example of classification of the operational avionic functionalities on the basis of their level of criticality (allocation of the functions by criticality).

In one embodiment of the invention, the level of criticality X1 corresponds to a level (strictly) higher than the level of criticality of the functional core FMS; the level of criticality X2 corresponds to a level of criticality equal (or substantially equal) to that of the functional core FMS; the level of criticality X3 corresponds to a level of criticality (strictly) lower than the level of criticality of the functional core FMS; the level of criticality F4 corresponds to a level of criticality much lower than the level of criticality of the functional core FMS.

By way of example, the operational avionic functionalities F1 concerning the man/machine interface 701 have a level of criticality X2 equal to that of the FMS. The automatic guidance functionalities F2 of the aircraft 702 have a level of criticality X1 higher than that of the FMS. The functionalities F4 as regards contact with air traffic or operational control centers 703 have a level of criticality X3 lower than that of the FMS. The functionalities F6 have a level of criticality X4 much lower than that of the FMS.

FIG. 8 presents an example of correlation between the levels of criticality and the access rights to avionic services.

In the example, a set of four "homogeneous" clients (801, 802, 803, 804) implementing the interactions with the external systems emerges. The four clients can realize subsets of homogeneous, in terms of (i) criticality and (ii) access rights, avionic functionalities. This number is optimum vis à vis the stability of the quality of service attributed per client, the stability of DAL (design assurance level, which denotes the quality of development of an onboard system, established by the international standard RTCA DO-178) levels compelling the implementation of the various clients and of the stability of access privileges to the communication interfaces associated with each of the clients and the stability of the configuration and mapping tables of the inputs/outputs (I/O) between clients and functional core.

Certain groupings can be carried out: the functionalities can be shared out among four groups 801, 802, 803 and 804, for example. The first group 801 comprises, by way of example, the man/machine interface functionalities F1, associated with a level of criticality X2 and with an access right D3. The group 802 comprises the functionalities of automatic guidance of the airplane and flight security. The group 803 comprises the functionalities of exchange with the ground authority and assistance with onboard decisions. The group 804 comprises the functionalities of development and simulation.

Figure 9:
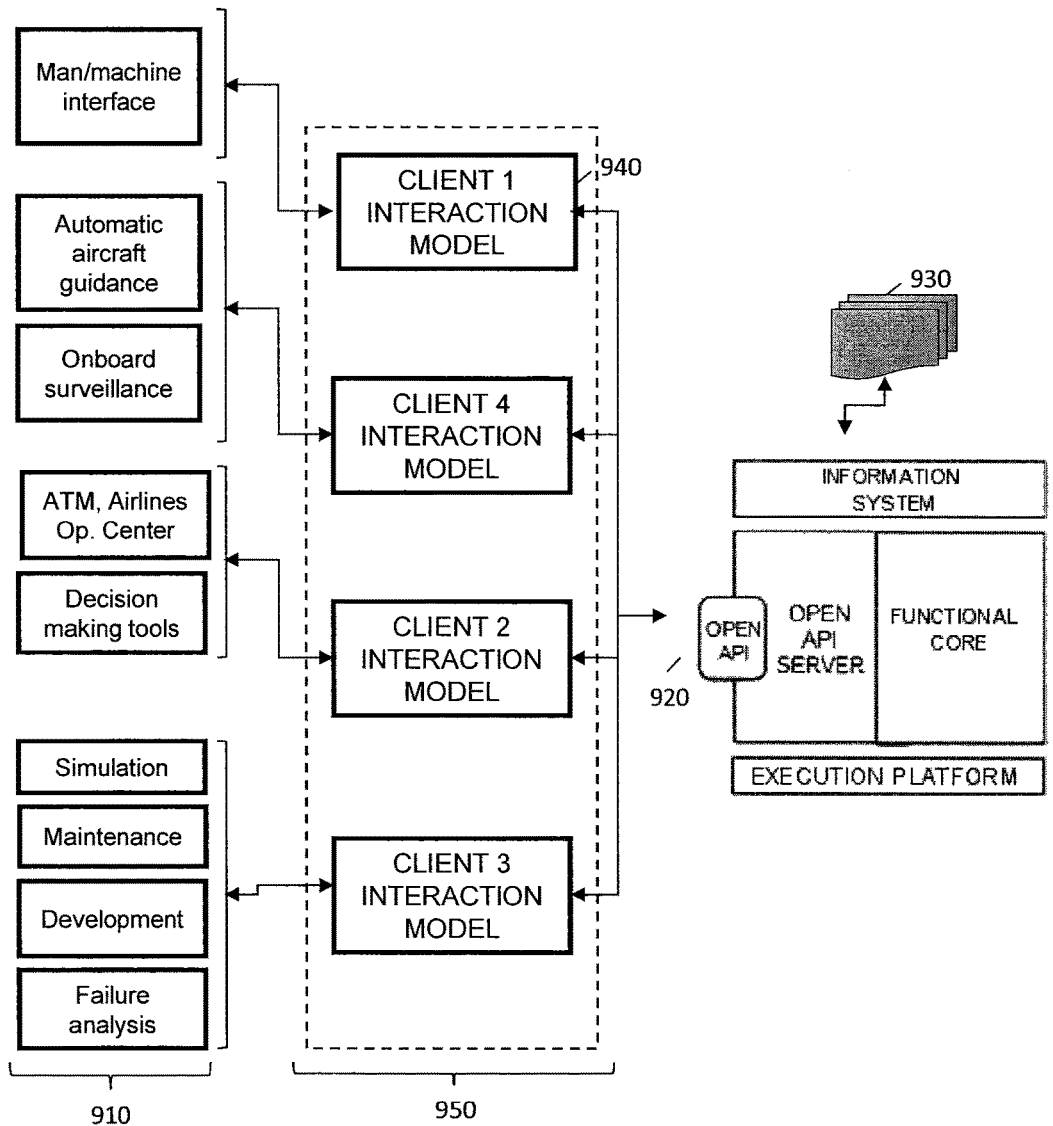
FIG. 9 illustrates some aspects of an embodiment of the method according to the invention.

FIG. 9 illustrates certain aspects of an embodiment of the method according to the invention.

The block 910 corresponds to the candidate operational avionic functions according to predefined categories (in the example, nine categories spread over N external systems). These operational avionic functions may be accommodated in avionic systems, and/or in systems of "open" type ("open world") and/or systems located on the ground.

The block 920 corresponds to the open API interfaces, within the context of the invention, providing the avionic services C1a for accessing the information system of the functional core (for example configuration data of the system, like operating modes and options, parameterization data comprising particularly navigation databases, characteristic data at the input and data and states reinforced by the functional core), the avionic services C2a (for example flight plan administration services), the avionic services C2b (for example flight plan editing), the avionic services C1b (for example for accessing flight plan data, 3D trajectory data and data for the associated predictions for flight plans manipulated by the functional core).

The hardware and software resources, for their part, are provisioned with regard to the field of use of the functional core.

The block 930 corresponds to the field of use of the functional core (maximum number of external systems, operational avionic functions, input/output resource provisions for each system on the basis of the access rights required for the operational function in question, fixed time quantum and/or percentage of processor time for external interaction, associated certification funds, etc.).

The block 940 corresponds to the configuration of a client. A client can group together various operational functions (from F1 to F9), one or more associated qualities of service. In one embodiment, the number of actually connected systems is known (for example per avionic function or service).

The block 950 denotes specific applications implementing the interaction model and the protocols with the external systems of each of the operational functions. These applications may, by way of example, correspond to a plurality of clients that make use of the open APIs in a homogeneous manner in terms of criticality and/or in terms of privileges or access rights.

Figure 10:
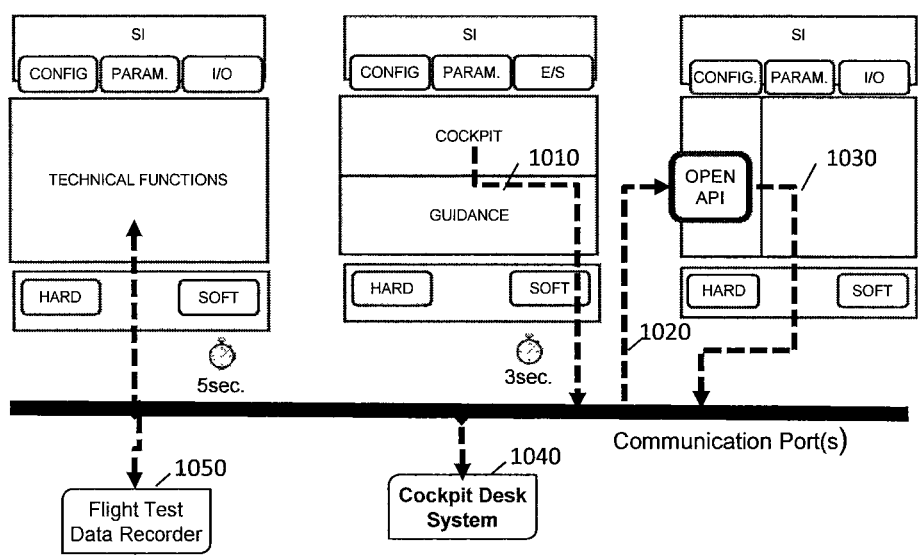
FIG. 10 illustrates an example of dynamic flow of the method for a given architecture.

FIG. 10 illustrates an example of the dynamic flow of the method for a given architecture.

In a first step 1010, an action by the pilot on the flight plan is received (or determined) from the man/machine interface in the cockpit (F1). In a second step 1020, the avionic capabilities of the functional core are implemented in order to respond to the operational action (one or more avionic services are requested). In a third step 1030, the data of the functional core are retrieved (for example in their standard content C4). In a fourth step 1040, the data received are processed (for example formatted) and then transmitted to the display system that is present in the cockpit (F1). Finally, in a fifth step 1050, the processed data are transmitted to the flight test behavior recording and analysis system ("Flight Test Data Recorder", F8).

Figure 11:
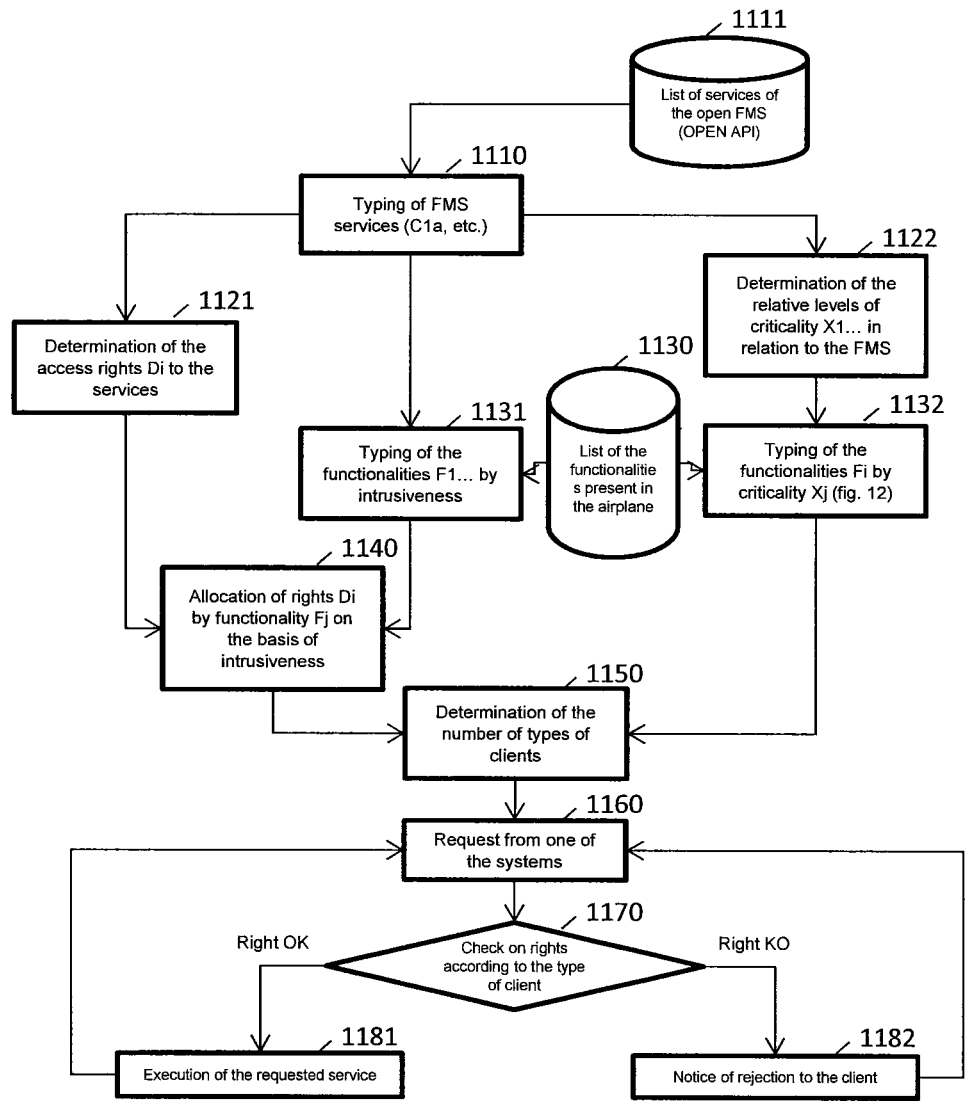
FIG. 11 illustrates examples of steps of the method according to the invention.

FIG. 11 illustrates examples of steps of the method according to the invention.

In a first step 1110, the avionic functionalities are typed by intrusiveness and criticality. In one embodiment, it can be accomplished using a configuration file 1111 loaded by the OPEN API, so that a new client is able to connect without having to reopen the code of the API. The substeps corresponding to this typing (i.e. of rights allocation) can be carried out in real time.

Subsequently, the access rights Di to the avionic services are determined 1121. In parallel or successively, the relative levels of criticality Xi in relation to the FMSs are determined 1122. On the basis of the list of avionic functionalities 1130 that are present in the airplane, the typing of the functionalities by intrusiveness 1131 and/or by criticality 1132 is determined.

In step 1140, the access rights are allocated by avionic functionalities Fi on the basis of the determined intrusiveness, and then, in step 1150, the number of types of clients is determined.

All of the steps described above can be carried out offline (that is to say during the design of the open digital core and of its interface).

In step 1160, a request is received or an interaction is detected from one of the connected systems, which wishes to access one or more avionic services. The various access rights are then checked in step 1170, on the basis of the type of client. If access is authorized, the requested avionic service is executed in step 1181 (or the plurality of avionic services, as the case may be). Otherwise, if access is not authorized in step 1182, the client is notified of the rejection of its request.

The present invention can be implemented on the basis of hardware and/or software elements. It may be available as a computer program product on a computer-readable medium. The medium may be electronic, magnetic, optical or electromagnetic. The device implementing one or more of the steps of the method can use one or more dedicated electronic circuits or an all-purpose circuit. The technique of the invention can be carried out on a reprogrammable computation machine (for example a processor or microcontroller) executing a program comprising an instruction sequence, or on a dedicated computation machine (for example a set of logic gates like an FPGA or an ASIC, or any other hardware module). A dedicated circuit can particularly speed up performance as regards access and execution of the avionic services. As an example of hardware architecture suited to implementing the invention, a device may have a communication bus to which are connected a central processing unit or microprocessor (CPU), which processor may be "multi-core" or "many-core"; a read only memory (ROM) that can have the programs required for implementing the invention; a random access memory or cache memory (RAM) having registers suitable for recording variables and parameters created and modified in the course of the execution of the aforementioned programs; and a communication or I/O interface (I/O being an acronym for "Input/Output") suitable for transmitting and receiving data. When the invention is installed on a reprogrammable computation machine, the corresponding program (that is to say the instruction sequence) can be stored in or on a removable (for example a flash memory, an SD card, a mass storage means such as a hard disk e.g. an SSD) or nonremovable, volatile or nonvolatile storage medium, said storage medium being partially or totally readable by a computer or a processor. The telecommunications network may be 2G, 3G, 4G, Wifi, BLE, optical fiber, of proprietary type or based on a combination of these networks. The reference to a computer program that, when executed, carries out any one of the functions described previously is not limited to an application program executed on a single host computer. On the contrary, the terms computer program and software are used here in a general sense to refer to any type of computer code (for example a piece of application software, a piece of firmware, a microcode or any other form of computer instruction) that can be used in order to program one or more processors in order to implement aspects of the techniques described here. The computer means or resources may be centralized and/or may be distributed ("cloud computing"), possibly with or based on peer-to-peer and/or virtualization and/or redundancy technologies. The software code can be executed on any appropriate processor (for example a microprocessor) or processor core or a set of processors, whether they are provided in a single computation device or in a manner distributed among multiple computation devices.

The invention claimed is:

1. A method for managing avionic data between a flight management system FMS and one or more clients of said the flight management system FMS, the flight management system FMS comprising physical resources accessible through one or more avionic services Ci (1,n);

an execution of one or more avionic services Ci (1,n) determining an avionic functionality Fj (1,m);

each avionic functionality Fj (1,m) being associated with an intrusiveness parameter $I_k$ and a criticality parameter $C_k$;

the method comprising the steps of:

receiving a request from a client, said request specifying a call to an avionic functionality Fj (1,m);

determining a parameter associated with a predefined execution right for an avionic service Ci (1,n), said parameter being dependent on at least one of the following: a predefined intrusiveness and criticality parameters associated with said avionic functionality Fj (1,m); and comparing the determined execution right parameter with one or more predefined execution rights, wherein an avionic service corresponds to an avionic service comprising at least one of the following: an avionic service for accessing an information system of a functional core of the FMS, an avionic service for flight plan management or administration, and an avionic service for accessing data of a flight plan or of a trajectory of an aircraft;

wherein a level of criticality being selected from among a plurality of predefined criticality ranges;

wherein the plurality of predefined criticality ranges comprising four predefined criticality ranges, which comprise a level of criticality X1 strictly higher than a level of criticality of the functional core FMS, a level of criticality X2 equal to the level of criticality of the functional core FMS, a level of criticality X3 strictly lower than the level of criticality of the functional core FMS, and a level of criticality X4 much lower than the level of criticality of the functional core FMS; and wherein one or more intrusiveness or criticality parameters being dependent on a flight context.

2. The method as claimed in claim 1, further comprising a step of executing one or more avionic services and communicating a result to the client.

3. The method as claimed in claim 1, further comprising a step of notifying the client of a rejection of its request.

4. The method as claimed in claim 1, wherein an avionic functionality being selected from among the avionic functionalities comprising at least one of the following: a man/machine interface functionality F1, an automatic aircraft guidance functionality F2, a flight and trajectory surveillance and monitoring functionality F3, an air traffic and operational control centers contact functionality F4, a strategic decision making or flight optimization tool functionality F5, a flight simulation functionality F6, a maintenance and operational preparation functionality F7, a ground & flight development functionality F8, and a failure analysis and flight recorder functionality F9.

5. The method as claimed in claim 1, wherein an avionic functionality being executed according to a predefined avionic interaction model, the predefined avionic interaction model being chosen from among the interaction models comprising at least one of the following: a man/machine interaction model, an interaction model comprising automatic aircraft guidance, an interaction model comprising onboard surveillance, an interaction model known as ATM/Airlines Operation Center, and an interaction model known as Simulation/Maintenance/Development/Failure Analysis.

6. The method as claimed in claim 1, wherein the intrusiveness and the criticality parameters are configurable.

7. The method as claimed in claim 1, wherein one or more intrusiveness and criticality parameters are dependent on a flight context.

8. A non-transitory computer program product, said computer program comprising code instructions for execution on a computer, the code instructions comprising:

receiving a request from a client, said request specifying a call to an avionic functionality Fj (1,m);

determining a parameter associated with a predefined execution right for an avionic service Ci (1,n), said parameter being dependent on at least one of the following: a predefined intrusiveness and criticality parameters associated with said avionic functionality Fj (1,m); and comparing the determined execution right parameter with one or more predefined execution rights, wherein an avionic service corresponds to an avionic service comprising at least one of the following: an avionic service for accessing an information system of a functional core of a FMS, an avionic service for flight plan management or administration, and an avionic service for accessing data of a flight plan or of a trajectory of an aircraft;

wherein a level of criticality being selected from among a plurality of predefined criticality ranges;

wherein the plurality of predefined criticality ranges comprising four predefined criticality ranges, which comprise a level of criticality X1 strictly higher than a level of criticality of the functional core FMS, a level of criticality X2 equal to the level of criticality of the functional core FMS, a level of criticality X3 strictly lower than the level of criticality of the functional core FMS, and a level of criticality X4 much lower than the level of criticality of the functional core FMS; and wherein one or more intrusiveness or criticality parameters being dependent on a flight context.

9. A system comprising:

the system being configured to receive a request from a client, said request specifying a call to an avionic functionality Fj (1,m);

the system being configured to determine a parameter associated with a predefined execution right for an avionic service Ci (1,n), said parameter being dependent on at least one of the following: a predefined intrusiveness and criticality parameters associated with said avionic functionality Fj (1,m); and the system being configured to compare the determined execution right parameter with one or more predefined execution rights, wherein an avionic service corresponds to an avionic service comprising at least one of the following: an avionic service for accessing an information system of a functional core of a FMS, an avionic service for flight plan management or administration, and an avionic service for accessing data of a flight plan or of a trajectory of an aircraft;

wherein a level of criticality being selected from among a plurality of predefined criticality ranges;

wherein the plurality of predefined criticality ranges comprising four predefined criticality ranges, which comprise a level of criticality X1 strictly higher than a level of criticality of the functional core FMS, a level of criticality X2 equal to the level of criticality of the functional core FMS, a level of criticality X3 strictly lower than the level of criticality of the functional core FMS, and a level of criticality X4 much lower than the level of criticality of the functional core FMS; and wherein one or more intrusiveness or criticality parameters being dependent on a flight context.

10. The system as claimed in claim 9 wherein the system comprises a flight management system FMS and one or more clients of said flight management system FMS.

11. The system as claimed in claim 9, wherein the system comprises at least one electronic flight bag of EFB type.

* * * * *